(12) United States Patent
Cappon

(10) Patent No.: US 12,325,194 B2
(45) Date of Patent: Jun. 10, 2025

(54) DEVICE FOR WELDING ELECTROFUSION FITTINGS WITH EXTENSION CABLE

(71) Applicant: Georg Fischer Omicron S.r.l., Caselle di Selvazzano (IT)

(72) Inventor: Roberto Cappon, Venice (IT)

(73) Assignee: GEORG FISCHER OMICRON S.R.L., Caselle di Selvazzano (IT)

( * ) Notice: Subject to any disclaimer, the term of this patent is extended or adjusted under 35 U.S.C. 154(b) by 938 days.

(21) Appl. No.: 17/353,846

(22) Filed: Jun. 22, 2021

(65) Prior Publication Data

US 2021/0402710 A1  Dec. 30, 2021

(30) Foreign Application Priority Data

Jun. 25, 2020 (EP) .................................. 20 182 318

(51) Int. Cl.
| | |
|---|---|
| *B29C 65/22* | (2006.01) |
| *B29C 65/00* | (2006.01) |
| *B29C 65/30* | (2006.01) |
| *B29L 31/24* | (2006.01) |

(52) U.S. Cl.
CPC ............ *B29C 65/222* (2013.01); *B29C 65/30* (2013.01); *B29C 66/91231* (2013.01); *B29C 66/95* (2013.01); *B29L 2031/24* (2013.01)

(58) Field of Classification Search
CPC . B29C 65/222; B29C 65/30; B29C 66/91231; B29C 66/95; B29L 2031/24
USPC .......................................................... 219/67
See application file for complete search history.

(56) References Cited

U.S. PATENT DOCUMENTS

| | | | | |
|---|---|---|---|---|
| 4,994,655 | A | * 2/1991 | Handa ................... | B29C 65/342 |
| | | | | 219/535 |
| 8,653,424 | B2 | * 2/2014 | Merle .................. | B29C 66/5229 |
| | | | | 219/535 |
| 2001/0050278 | A1 | 12/2001 | Chenault | |
| 2007/0215600 | A1 | 9/2007 | Merle | |

FOREIGN PATENT DOCUMENTS

| | | | | |
|---|---|---|---|---|
| CN | 105225777 | A * | 1/2016 | |
| EP | 0352128 | A2 * | 1/1990 | ............. B29C 65/34 |
| JP | H0743067 | B2 * | 8/1995 | ............... A61B 5/05 |
| JP | H0924547 | A | 1/1997 | |
| JP | 3731877 | B2 * | 1/2006 | ........... B29C 65/342 |

(Continued)

*Primary Examiner* — Jimmy Chou
(74) *Attorney, Agent, or Firm* — LEYDIG, VOIT & MAYER, LTD.

(57) ABSTRACT

A method keeps a voltage or a current constant during a welding process of an electrofusion fitting. The method includes: connecting an extension cable between a connection cable of a welding power supply and the electrofusion fitting to be welded; detecting the extension cable by the welding power supply; detecting and recording the electrofusion fitting to be welded and its data by the welding power supply; autonomously supplying the current or the voltage with the welding power supply; and autonomously regulating the current or the voltage based upon the detection of the connected extension cable and a resulting resistance due to the connected extension cable. The current or the voltage is adjusted such that the current or the voltage remains constant during the welding of the electrofusion fitting.

6 Claims, 1 Drawing Sheet

(56) References Cited

FOREIGN PATENT DOCUMENTS

| JP | 2007145011 A | * | 6/2007 | ............. | B29C 65/34 |
| JP | 2018053976 A | * | 4/2018 | ............... | H05B 3/40 |
| JP | 2018156740 A | * | 10/2018 | ............... | H05B 3/40 |
| WO | WO 2005023522 A1 | | 3/2005 | | |

* cited by examiner

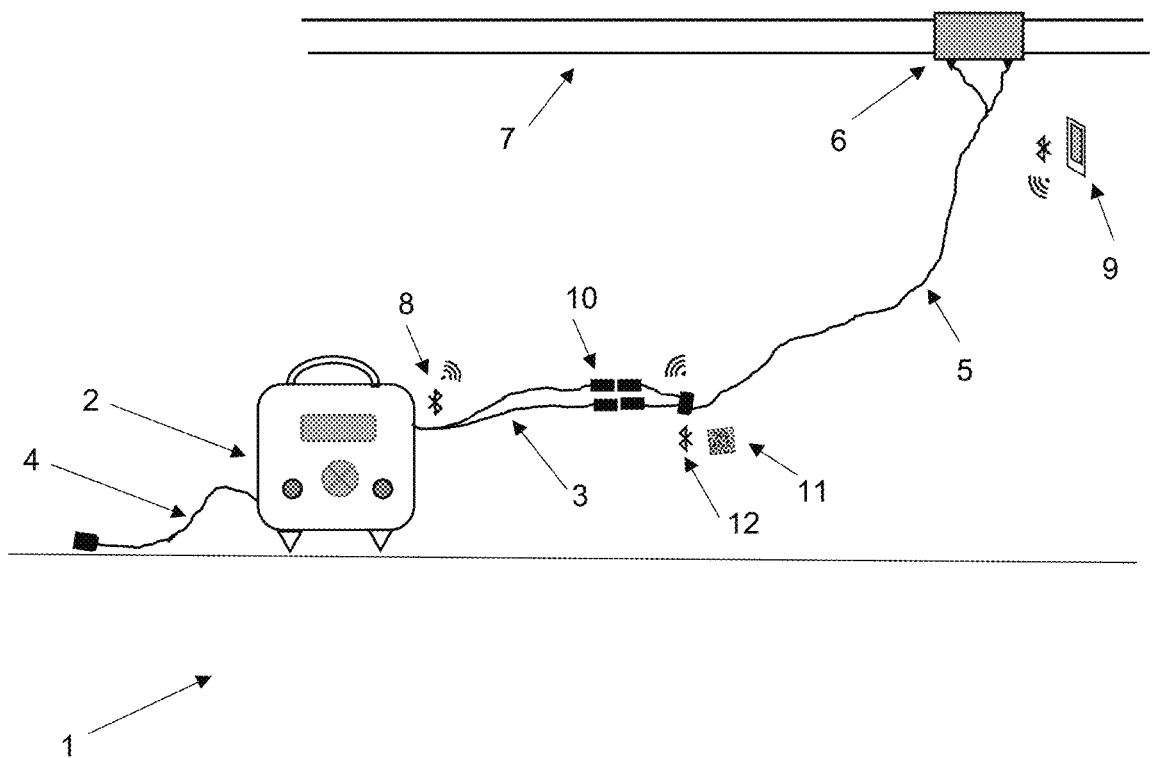

DEVICE FOR WELDING ELECTROFUSION FITTINGS WITH EXTENSION CABLE

CROSS-REFERENCE TO PRIOR APPLICATIONS

Priority is claimed to European Patent Application No. EP 20 182 318.4, filed on Jun. 25, 2020, the entire disclosure of which is hereby incorporated by reference herein.

FIELD

The invention relates to a method for keeping the voltage or the current constant during the fusion process of an electrofusion fitting and a device for welding electrofusion fittings with at least one connection cable connected to the welding power supply unit for connecting and heating the heating wire of an electrofusion fitting.

BACKGROUND

In order to connect tubular molded parts made of a plastic material, electro fusion fittings may be used. These fittings have a heating wire winding. By supplying electrical heating energy the heating wire winding is heated and the fitting is welded with the tubular molded part. The energy necessary for the welding process is supplied from a device for welding of electrofusion fittings. The needed energy required depends on the material, the type, and the size of the electro fusion fittings. The required welding time is also controlled by device dependent on the fitting to be welded.

WO 2005/023522 discloses a method to optimize the welding energy input into the coil and measuring the inductance of the heating coil and controlling the welding energy input and using at least one correction factor, which is determined from a measured electrical parameter from the heating coil.

The disadvantage of such devices for welding electrofusion fittings is that you have to bring the device close to the electro fusion fitting for the welding process because of the connection cables, which are fixed and limited in their length in order to avoid a high resistance. Especially in cases where the fitting respectively the welding place is in a deep trench or if the pipeline goes along a ceiling is it difficult to bring the welding power supply close to the welding place.

SUMMARY

In an embodiment, the present invention provides a method that keeps a voltage or a current constant during a welding process of an electrofusion fitting. The method includes: connecting an extension cable between a connection cable of a welding power supply and the electrofusion fitting to be welded; detecting the extension cable by the welding power supply; detecting and recording the electrofusion fitting to be welded and its data by the welding power supply; autonomously supplying the current or the voltage with the welding power supply; and autonomously regulating the current or the voltage based upon the detection of the connected extension cable and a resulting resistance due to the connected extension cable. The current or the voltage is adjusted such that the current or the voltage remains constant during the welding of the electrofusion fitting.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 shows an inventive device which is connected to an electrofusion fitting for the welding process.

DETAILED DESCRIPTION

In an embodiment, the present invention provides a method and a device that enables an execution of a welding on each places with one and the same device wherein the power consumption is kept as low as possible.

An embodiment of the present invention provides a method comprising the following steps:
  detection and recording of the electro fitting to be welded and its data by a welding power supply unit,
  autonomous supplying of the required current or voltage with the welding power supply unit,
  connection of an extension cable between a connection cable of the welding power supply unit and the fitting to be welded,
  detection of connected the extension cable by the welding power supply unit, and/or
  autonomous regulation of the current or voltage due to the connected extension cable and the resulting increased resistance, wherein the current or voltage adjusts in such a way that the current or voltage remains constant.

An embodiment or the present invention provides a device for welding electrofusion fittings that has at least one removable extension cable arranged in each case on each of the connection cables, wherein the current or voltage of the device is not changing respectively remains constant despite an increase in resistance due to the connected extension cable.

A method according to an embodiment of the present invention may include a detection and recording of the electro fitting to be welded and its data by a welding power supply unit or by a portable terminal. The detection and recording may be done by means of tags as a code or a chip, which can be scanned for example by the welding power supply unit, which optionally has a scanner function, or with a portable terminal. Through the detection and recording of the data, the welding power supply unit gets all necessary information about the electrofusion fitting to be welded, that means the material, the geometry, the material of the wire, the specific resistance, etc. Also, a manual input of the data of the electrofusion fitting to the welding power supply unit is possible. After the recording of the data by the welding power supply unit, the welding power supply unit does autonomously supply the required current or voltage to the electrofusion fitting. An extension cable will be connected between a connection cable of the device for welding electrofusion fittings and the fitting to be welded. This brings the advantage that the welding power supply unit does not have to be close to the fitting if the place is not readily accessible and makes the work easier. The welding power supply unit detects the extension cable and autonomously regulates the current or voltage due to the connected extension cable and the resulting increased resistance, wherein the current or voltage adjusts in such a way that the current or voltage remains constant. By ensuring that the current or voltage remains constant despite the increased resistance, the device complies with the required standard.

In a preferred embodiment, the method determines the resistance of the heating wire winding in the electrofusion fitting during the welding process, and the applied voltage or the supplied current is regulated according to the change in resistance in the heating wire winding in such a way that the voltage or the current remains constant throughout the welding process. During the welding process, the resistance of the heating wire winding is changing, and to ensure a good quality of the welded joint and to comply with the standard, the welding power supply unit adjusts the current or the voltage accordingly.

Advantageously, the method may adjust the applied voltage or the supplied current during the welding process because of the change of the resistance in the extension cable during the welding process. The voltage or the current, which is applied from the welding power supply unit, may be adjusted according to the change in the resistance in the extension cable in such a way that the voltage or the current remains constant throughout the welding process. That means, for example, if the resistance in the extension cable increases, the voltage also increases so that the current will be constant. In a preferred embodiment, the current will be monitored during the complete welding process, and if there is a change in the current, which comes from a change in the resistance, it will be adjusted autonomously by the welding power supply unit. Alternatively, the welding power supply unit applies a constant voltage during the welding process, and the current will be adjusted according to the change in the resistance in the extension cable also if a change in the heating wire winding arises.

In a preferred embodiment, the instantaneous resistance in the heating wire winding is monitored by means of a resistance sensor. Through this information, the welding power supply unit adjusts the current or the voltage to hold the current or the voltage constant.

In a further embodiment, it is possible that the temperature of the resistance in the heating wire winding is monitored by means of temperature sensor and the instantaneous resistance is calculated by means of the data of the welding fitting (preferably with the specific resistance of the heating wire winding which has been recorded by the welding power supply unit).

Accordingly, embodiments of the present invention provide an improved a device for welding electrofusion fitting, which includes at least one removable extension cable, which is arranged on each of the connection cables, wherein the current or voltage of the device is not changing despite an increase in resistance due to the connected extension cable.

An embodiment of the device for welding electrofusion fittings may include a welding power supply unit with a communications interface. The communications interface allows the welding power supply unit to record data (for example parameters of the fitting to be welded or parameters from the extension cable or other necessary data for the welding process) as well as to communicate with the user (e.g., the installer of the fitting who has an appropriate application or other software to communicate with the welding power supply unit). In a preferred embodiment, such an application or a software is installed on a portable terminal.

The device has at least one (preferably, two) connection cables connected to the welding power supply unit for connecting and heating the heating wire of an electrofusion fitting. In a preferred embodiment, one side of the connection cable is fixed on the welding power supply unit, and a connector is arranged on the other side of the connection cable is. At least one removable extension cable is arranged on each of the connection cables, wherein the current or voltage of the device respectively remains constant despite an increase in resistance, which is due to the connected extension cable. An advantage is that, if the fitting to be weld is in a deep ditch or anywhere where it is difficult to place the welding power supply unit beside, the extension cable can be connected, and despite the additional resistance generated through the extension cable, the current or the voltage remains the same due to the autonomous increasing or decreasing of the voltage or current according to the change of the resistance.

In a preferred embodiment, the extension cable is "smart," meaning that data and information about the extension cable itself will be supplied to the welding power supply unit or a portable terminal.

In a preferred embodiment, the extension cable has a tag, wherein the tag allows the welding power supply unit or a portable terminal (which is connected with the welding power supply unit) to detect and record the data about the extension cable. Through these data, the welding power supply unit also gets the information of the resistance of the extension cable, which allows the welding power supply unit to calculate the corresponding change in the voltage or current to maintain one of them as constant. As a tag, a chip, or code, or something else that can be used to provide an identification, may be used.

In a further embodiment, the extension cable has a communication interface for the communication with the welding power supply unit (e.g., with the communication interface of the welding power supply unit or a portable terminal). The advantage of such an embodiment is that the data exchange can take place without additional effort of the installer. The welding power supply unit can identify automatically the extension cable and can adjusts the current or voltage accordingly. Of course, it is also possible to connect more than one extension cable together, which also will be identified by the welding power supply unit and adjusted the current or voltage accordingly. An embodiment with a tag providing an identification also allows the connection of more than one extension cable.

In a preferred embodiment, the extension cable has a data memory, wherein the data memory contains information about the extension cable, preferably about the cross-section, the length, the material, the specific resistance and/or the temperature coefficients. Such data will be exchanged by the communication interface such that the data from the extension cable can be transmitted to the communication interface of the welding power supply unit, thereby enabling the unit to record the extension cable and its resistance and to adjust autonomously the current or the voltage so that one of them remains constant.

The communication interface may be a Bluetooth, radio, infrared, or cable interface, or may be another standardized interface.

All possible embodiments can be freely combined with one another, and the method features may apply to the device, and vice versa.

An exemplary embodiment of the invention is described by way of the Figure. The invention is not restricted to only the exemplary embodiment of the Figure.

FIG. 1 shows a device 1 for welding electrofusion fittings. As an example, the fitting 6 that is to be weld is arranged at a high position on a pipeline 7 where it is difficult to place the welding power supply unit 2 close to it. Preferably, the welding power supply unit 2 is connected to the electricity gird electricity generator with a power cable 4.

The device 1 may include a welding power supply unit 2 with a communication interface 8, which enables the exchange of the data with a portable terminal 9 from the installer or with the extension cable 5 directly. At least one connection cable 3 is arranged on the welding power supply unit 2, wherein the connection cable 3 has, on the other side, a connector 10 arranged, and can be contacted directly on the fitting 6 to be weld as well as connected with a removable extension cable 5. The extension cable 5 is smart, that means it has a tag 11 and/or a communication interface 12. The communication interface 12 of the extension cable 5 enables a direct data exchange with the welding power supply unit 2 and/or the portable terminal 9. With the exchanged data it is possible for the welding power supply unit 2 to know the resistance of the extension cable 5, and to adjust the current or the voltage accordingly. Alternatively, the extension cable 5 may have a tag 10, wherein the tag 10 can be scanned by the portable terminal 9 or the welding power supply unit 2 to identify the extension cable 5, which enables the appropriate adjustment of the current or the voltage.

According to a method of an embodiment of the present invention, the welding power unit 2 detects and recognizes the data of the electrofusion fitting 6, preferably by means of a portable terminal 9 which enables the scanning of a code from the fitting 6 that will be sent to the welding power supply unit 2. The availability of such data enables the welding power supply unit 2 to adjust the required current or voltage for the welding of the fitting. To overcome the distance, an extension cable 5 will be connected with respectively be the connector at the end of the cables 3, 5. Through the communication interface 12 of the connection cable 5, an autonomous data exchange will be done. Alternatively, the extension cable 5 has a tag 10, which can be scanned; and thus, the welding power supply unit 2 knows which extension cable is connected, and knows all necessary information that allows the unit 2 to calculate the current or the voltage accordingly.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS 1 device for welding electrofusion fittings
2 welding power supply unit
3 connection cables
4 power cable
5 extension cable
6 electrofusion fitting
7 pipeline
8 communication interface welding power supply unit
9 portable terminal
10 connector
11 tag
12 communication interface extension cable

The invention claimed is:

1. A method for keeping a voltage or a current constant during a welding process of an electrofusion fitting with a device for welding of the electrofusion fitting, the device using an extension cable, the method comprising:
   connecting the extension cable between a connection cable of a welding power supply and the electrofusion fitting to be welded;
   detecting the extension cable using the welding power supply;
   detecting data about the electrofusion fitting and recording the data about the electrofusion fitting to be welded using the welding power supply;
   determining a change in resistance of the extension cable by monitoring the resistance of the extension cable;
   autonomously supplying the current or the voltage with the welding power supply;
   autonomously regulating the current or the voltage based upon the detection of the connected extension cable, the determined change in resistance of the extension cable, and a resulting resistance due to the connected extension cable; and
   monitoring an instantaneous resistance of a heating wire winding in the electrofusion fitting during the welding process,
   wherein the current or the voltage is adjusted such that the current or the voltage remains constant during the welding of the electrofusion fitting,
   wherein the voltage or the current is regulated according to a change in the instantaneous resistance in the heating wire winding such that the voltage or the current remains constant throughout the welding process, and
   wherein monitoring the instantaneous resistance includes monitoring an output of a temperature sensor and calculating the instantaneous resistance based on the monitored output and the recorded data about the electrofusion fitting.

2. The method according to claim 1, wherein the instantaneous resistance in the heating wire winding is monitored by a resistance sensor.

3. The method according to claim 1, wherein a portable terminal transmits the detected and recorded data about the electrofusion fitting to the welding power supply.

4. The method according to claim 3, comprising detecting data about the extension cable and recording the data about the extension cable with the portable terminal, wherein the portable terminal transmits the data about the extension cable to the welding power supply.

5. The method according to claim 4, wherein the data about the extension cable includes a resistance of the extension cable.

6. A method for keeping a voltage or a current constant during a welding process of an electrofusion fitting with a device for welding of the electrofusion fitting, the device using an extension cable, the method comprising:

connecting the extension cable between a connection cable of a welding power supply and the electrofusion fitting to be welded;

detecting the extension cable using the welding power supply;

detecting data about the electrofusion fitting to be welded and recording the data about the electrofusion fitting to be welded using the welding power supply, wherein a portable terminal transmits the detected and recorded data about the electrofusion fitting to the welding power supply;

detecting data about the extension cable and recording the data about the extension cable with the portable terminal, wherein the portable terminal transmits the data about the extension cable to the welding power supply;

determining a change in resistance of the extension cable by monitoring the resistance of the extension cable;

autonomously supplying the current or the voltage with the welding power supply; and autonomously regulating the current or the voltage based upon the detection of the connected extension cable, the determined change in resistance of the extension cable, and a resulting resistance due to the connected extension cable, wherein the current or the voltage is adjusted such that the current or the voltage remains constant during the welding of the electrofusion fitting.

\* \* \* \* \*